United States Patent [19]

Shiba

[11] Patent Number: 4,942,567
[45] Date of Patent: Jul. 17, 1990

[54] DISK REPRODUCING METHOD
[75] Inventor: Takahumi Shiba, Saitama, Japan
[73] Assignee: Pioneer Electronic Corporation, Tokyo, Japan
[21] Appl. No.: 160,807
[22] Filed: Feb. 26, 1988
[30] Foreign Application Priority Data Feb. 27, 1987 [JP] Japan .................................. 62-46357

[51] Int. Cl.⁵ .............................................. G11B 7/00
[52] U.S. Cl. .................................. 369/124; 369/44.11; 369/44.21
[58] Field of Search ....................... 369/32, 41, 43, 44, 369/45, 124

[56] References Cited
U.S. PATENT DOCUMENTS
4,761,692 8/1988 Stephan ................................. 369/44

Primary Examiner—Steven L. Stephan
Attorney, Agent, or Firm—Sughrue, Mion, Zinn, Macpeak & Seas

[57] ABSTRACT

A disk reproducing method, such as may be used with a compact disk or video disk, in which playing can be quickly restored following track flow caused, for example, by an external shock applied to the player. The disk is rotated with a spindle motor, the rotation of which is controlled with a first servo circuit. Data recorded on the disk is reproduced with a pickup. Tracking of the pickup is controlled with a second servo circuit. The pickup is driven with a slider motor radially of the disk. Rotation of the slider motor is controlled with a third servo circuit. When the first servo circuit is maintained unlocked for a predetermined period of time, the second and third servo circuits are turned off for a predetermined period of time, and then turned back on.

3 Claims, 3 Drawing Sheets

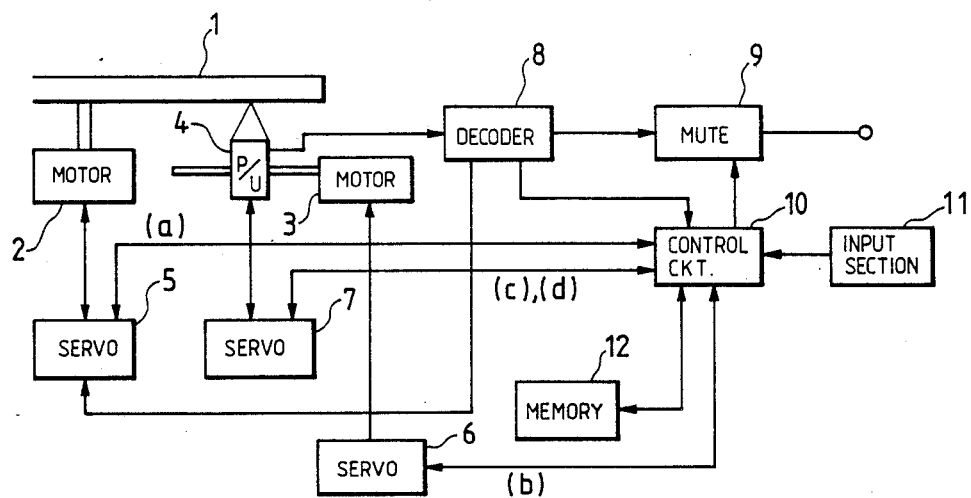
FIG. 1
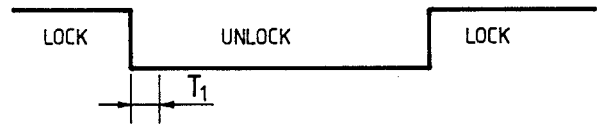
FIG. 2(a)
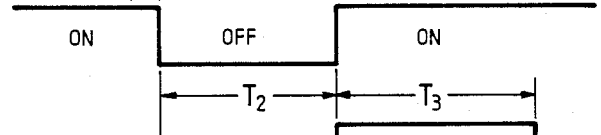
FIG. 2(b)
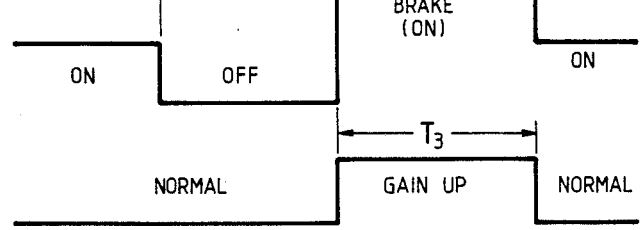
FIG. 2(c)
FIG. 2(d)

DISK REPRODUCING METHOD

BACKGROUND OF THE INVENTION

The present invention relates to a method for reproducing data recorded on a disk which is suitable for use in a compact disk player o video disk player.

When, for instance, during the playing of a compact disk, the track is jumped or an external impact is exerted on the disk player, sometimes the tracking servo is unlocked. If the tracking servo is maintained unlocked for a certain period of time, then the slider (carriage) motor is driven by the DC component of the tracking error signal so that a so-called "tracking flow" phenomenon occurs. In this case, the signal cannot be read, and accordingly the spindle servo is also unlocked.

In conventional systems, when the above-described phenomenon occurs, the reproducing operation is suspended. After all servo circuits are de-energized, a set-up operation is performed to energize the servo circuits again. The set-up operation generally includes a process of rotating the disk again and locking in the servo circuits. Accordingly, if track flow occurs, it is necessary to issue the reproduction instructions again. As a result, even if track flow is eliminated automatically to permit reproduction again, a relatively long period of time elapses before reproduction can be started again, and the distance (width) of track flow is increased as much.

SUMMARY OF THE INVENTION

Accordingly, an object of the present invention is to provide a disk reproducing method in which, when track flow occurs, it is eliminated quickly to reduce the width of the track flow.

The foregoing object of the invention has been achieved by the provision of a disk reproducing method in which, according to the invention, a disk is rotated by a spindle motor; the rotation of the spindle motor is controlled by a first servo circuit; data recorded on the disk is reproduced by a pickup; the tracking of the pickup is controlled by a second servo circuit; the pickup is driven by a slider motor radially of the disk; the rotation of the slider motor is controlled by a third servo circuit; and when the first servo circuit is maintained unlocked for a predetermined period of time, the second and third servo circuits are turned off for a predetermined period of time and then turned on.

BRIEF DESCRIPTION OF THE DRAWINGS

FIG. 1 is a block diagram showing a disk player constructed according to the invention;

FIGS. 2(a)-(d) and 3 are a timing chart and a flow-chart, respectively, used for a description of the operation of the disk player;

DESCRIPTION OF THE PREFERRED EMBODIMENTS

Figure 3:
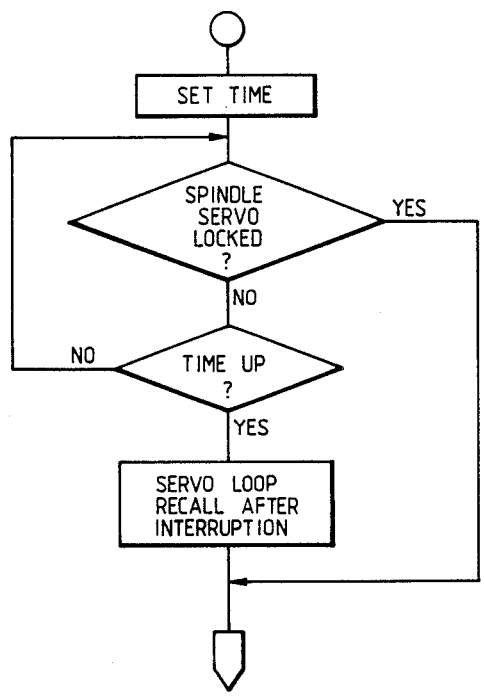

FIG. 1 is a block diagram showing a disk player constructed according to the present invention. When a reproducing operation instruction is inputted by an input section 11, a control circuit 10, implemented, for instance, with a microcomputer, controls servo circuits 5, 6, and 7 to accomplish the set-up operation.

First, the servo circuit 7 activates a focus servo system so that an objective lens (not shown) incorporated in a pickup 4 is driven to focus a laser beam on the signal recording surface of a disk 1. Next, the control circuit 10 controls the servo circuit 5 to drive a spindle motor 2. In this operation, the servo circuit 5 drives the spindle motor 2 with a predetermined current (voltage) for a predetermined period of time, and then closes the spindle servo loop so that the spindle motor 2 rotates the disk 1 at a predetermined speed. The control circuit 10 further controls the servo circuits 6 and 7 so that the servo circuit 6 drives a slider (carriage) motor 3 for moving the pickup 4 radially of the disk 1 and closes the slider servo loop, while the servo circuit 7 closes the tracking servo loop. As a result, the light spot focused on the disk 1 is controlled so as to follow the tracks; that is, tracking control of the light spot is effected so that the data can be reproduced.

The signal reproduced by the pickup 4 is applied to a decoder 8. If the signal is Table of Contents (TOC) data, the data read is stored in a memory 12 until the control of the control circuit 10. When the signal is ordinary audio data, it is applied through a muting circuit 9 to an amplifier (not shown), a loudspeaker (not shown), etc. Upon completion of the set-up operation, the control circuit 10 reads address data (time data, musical selection number data, etc.) from the output of the decoder to search for a specified piece of music and reproduce it.

The decoder 8 supplies a part of the reproduction signal outputted by the pickup 4 to the servo circuit 5. The servo circuit 5 separates a clock signal (synchronizing signal) from the reproduction signal using a phase-locked loop (PLL) circuit (not shown) incorporated therein, and compares the reproduction synchronizing signal with a predetermined reference synchronizing signal outputted by a fixed oscillator circuit (not shown) included therein so that the spindle motor 2 is controlled according to the result of the comparison (difference signal).

If the tracking servo loop is unlocked, for instance, when an external impact is exerted on the disk player, then it becomes impossible to detect the reproduction synchronizing signal, whereupon the spindle servo loop is unlocked. The servo circuit 5 detects the locking of the spindle servo loop, and supplies the detection signal (waveform (a) in FIG. 2) to the control circuit 10. When the spindle servo loop is maintained unlocked for a predetermined period of time $T_1$, the control circuit 10 controls the servo circuit 6 to open the slider servo loop ("OFF" in waveform (b) in FIG. 2). As a result, the movement of the slider (pickup 4) in the radial direction of the disk is stopped. At the same time, the servo circuit 7 is controlled so that the tracking servo loop is opened ("OFF" in waveform (c) in FIG. 2). This open-loop state is maintained for a predetermined period of time $T_2$. The period of time $T_2$ is determined in correspondence to a period of time (for instance, several tens of milliseconds) required for the moving part of the tracking actuator to return to the neutral point.

When the period of time $T_2$ has passed, the control circuit 10 controls the servo control circuit 6 again to close the slider servo loop (waveform (b) in FIG. 2). At the same time, the servo circuit 7 also is controlled in such a manner that the gain of the tracking servo loop is made larger than the normal value for a predetermined period of time $T_3$ (waveform (d) in FIG. 2). As a result, the tracking servo loop lock-in operation is achieved more quickly and positively.

For the period of time $T_3$, the servo circuit 7 places the tracking servo loop in a braking mode. In the braking mode, the tracking servo loop is closed with a predetermined timing. The timing is determined so as to prevent the pickup (light spot) 4 from going across a track (by applying a braking force). Therefore, the tracking servo loop is locked in more readily.

In the period of time $T_3$, the gain of the tracking servo loop is restored to the normal value, and the braking mode is released. When locked-in during the operation in the brake mode, the tracking servo loop is substantially closed ("on").

Since the tracking servo loop is locked in during the period of time $T_3$ in the above-described manner, the spindle servo loop is locked in automatically (waveform (a) in FIG. 2). During the above-described series of operations, the spindle servo loop is maintained ope (being different from the case where the set-up operation is performed again).

The above-described operations are summarized in the flowchart of FIG. 3.

Figure 4:
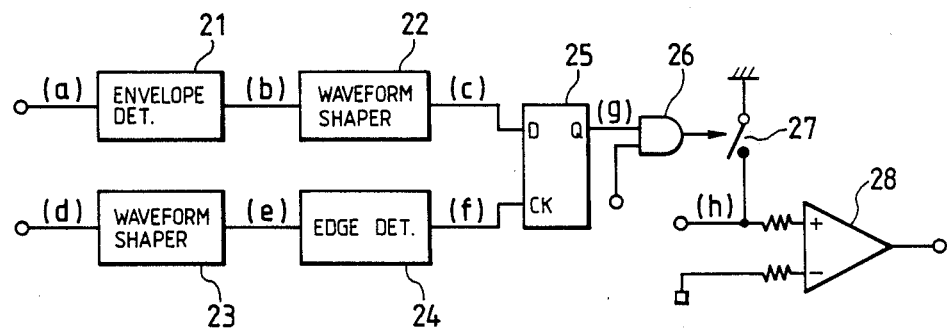
FIG. 4 is a block diagram showing a tracking control device in the disk player.
Figure 5A:
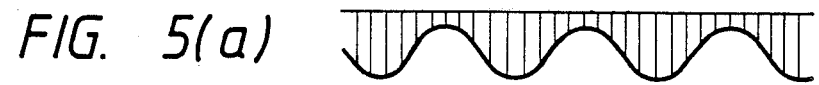
FIGS. 5(a)-(h) and 6(a)-(h) are timing charts used for a description of the operation of the tracking control device.
Figure 5B:
Figure 5C:
Figure 5D:
Figure 5E:
Figure 5F:
Figure 5G:
Figure 5H:
Figure 6A:
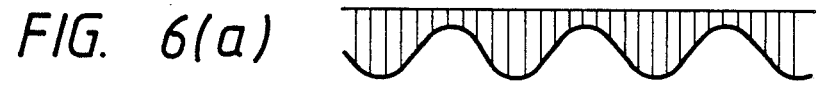
Figure 6B:
Figure 6C:
Figure 6D:
Figure 6E:
Figure 6F:
Figure 6G:
Figure 6H:

FIG. 4 is a block diagram showing a tracking control device for effecting the brake mode with the servo circuit 7. In FIG. 4, reference numeral 21 designates an envelope detecting circuit which detects the envelope of a received reproduced RF signal. The output detection signal of the circuit 21 is applied to a waveform-shaping circuit 22 where it is waveform-shaped into a pulse signal. Further in FIG. 4, reference numeral 23 designates a waveform-shaping circuit which waveform-shapes an inputted tracking error signal into a pulse signal. The edge of the resulting pulse signal is detected by an edge detecting circuit.

It is assumed that the light spot goes across tracks radially inwardly of the disk. In this case, the envelope of the RF signal, as shown in waveform (a) in FIG. 5, is detected, as shown in waveform (b) in FIG. 5, and converted into a pulse signal as shown in waveform (c) in FIG. 5. A tracking error signal as shown in waveform (d) in FIG. 5 is converted into a pulse signal as shown in waveform (e) in FIG. 5, and its edges are detected as shown in waveform (f) in FIG. 5.

In the case where, on the other hand, the light spot goes across tracks radially outwardly of the disk, the waveforms of the signals are as shown in FIG. 6 (in which the signals corresponding to those in FIG. 5 are designated by the same reference characters).

That is, the case where the light spot goes across tracks radially inwardly of the disk is different in the phase relation between the RF signal and the tracking error signal from the case where the light spot goes across tracks radially outwardly of the disk. In the case where the light spot goes across tracks radially inwardly of the disk, the RF signal is set to the low (L) level with a timing determined by the rising edges of the tracking error signal, and it is raised to the high (H) level at the falling edges of the tracking error signal. In the case where the light spot goes across tracks radially outwardly of the disk, the RF signal changes in level oppositely to that in the former case. Therefore, when the output of the waveform-shaping circuit 22 is latched by a delay flip-flop 25 using the output of the edge detecting circuit 24 as a clock signal, the output Q of the delay flip-flop 25 is as shown in waveform (g) in FIG. 5 or in waveform (g) in FIG. 6. The output Q is supplied through an AND gate 26 to a switch 27 to turn it on or off. The switch 27 is turned on when the output of the AND gate 26 is at the "H" level, and it is turned off when the output is at the "L" level. When the switch 27 is turned on, an input terminal of an amplifier circuit 28 for amplifying the tracking error signal is grounded. Therefore, only when the switch 27 is turned off is the tracking error signal amplified and outputted (as shown in the waveform (h) in FIG. 5 or in waveform (h) in FIG. 6). Thus, only a force to drive the light spot in a direction opposite its direction of movement (i.e., a braking force) is produced.

In the braking mode, the "H" level signal is applied to the other input terminal of the AND gate 26, and therefore the above described operation is performed. However, when the disk player is not in the braking mode, the "L" level signal is applied to the input terminal of the AND gate 26, and therefore the switch 27 is maintained off.

As described above, in the disk reproducing system of the invention, the disk is rotated by the spindle motor, the rotation of the spindle motor is controlled by the first servo circuit, the data recorded on the disk is reproduced by the pickup, the tracking of the pickup is controlled by the second servo circuit the pickup is driven by the slider motor radially of the disk the rotation of the slider motor is controlled by the third servo circuit, and when the first servo circuit is maintained unlocked for a predetermined period of time, the second and third servo circuits are turned off for the predetermined period of time and then again turned on. Therefore, the tracking actuator is locked again near the neutral point at all times, the amount of correction of the slider is reduced, and the track flow width (i.e., the width of the part which cannot be reproduced) is minimized. Furthermore, in the braking mode, even in the presence of eccentricity, the tracking servo (and accordingly the spindle servo) can be locked again quickly.

What is claimed is:

1. A disk reproducing method, comprising the steps of:
    rotating a disk with a spindle motor;
    controlling the rotation of said spindle motor with a first servo circuit;
    reproducing data on said disk by tracking said disk with a pickup;
    controlling the tracking of said pickup with a second servo circuit wherein said tracking is controlled by adjusting a gain of said second servo circuit;
    driving said pickup with a slider motor radially of said disk;
    controlling the rotation of said slider motor with a third servo circuit, said rotation being controlled by adjusting said third servo circuit in communication with said second servo circuit; and
    when said first servo circuit is maintained at other than a predetermined speed for a first predetermined period of time, turning off said second and third servo circuits for a second predetermined period of time and then turning said second and third servo circuits back on.

2. The disk reproducing method of claim 1, wherein said predetermined time is determined in accordance with an amount of time required for a moving part of a tracking actuator to return to a neutral point.

3. The disk reproducing method of claim 1, further comprising the steps of: following turning said second and third servo circuits back on, operating said second servo circuit in a braking mode while simultaneously increasing a gain of a tracking servo loop.

* * * * *